United States Patent
Schei et al.

(10) Patent No.: US 12,547,689 B2
(45) Date of Patent: Feb. 10, 2026

(54) SYSTEM AND METHOD FOR CONTINUOUS PRIVACY-PRESERVING FACIAL-BASED AUTHENTICATION AND FEEDBACK

(71) Applicant: HUMMINGBIRDS AI INC., Aventura, FL (US)

(72) Inventors: Nima Schei, Miami Beach, FL (US); Hamed Tabkhivayghan, Charlotte, NC (US); Ehsan Foroughi, Toronto (CA); David Alejandro Pabón Correa, Bogotá (CO)

(73) Assignee: HUMMINGBIRDS AI, INC., Aventura, FL (US)

( * ) Notice: Subject to any disclaimer, the term of this patent is extended or adjusted under 35 U.S.C. 154(b) by 277 days.

(21) Appl. No.: 18/048,691

(22) Filed: Oct. 21, 2022

(65) Prior Publication Data

US 2023/0128577 A1    Apr. 27, 2023

Related U.S. Application Data

(60) Provisional application No. 63/271,140, filed on Oct. 23, 2021.

(51) Int. Cl.
*G06F 21/32* (2013.01)
*G06F 21/62* (2013.01)
(Continued)

(52) U.S. Cl.
CPC .......... *G06F 21/32* (2013.01); *G06F 21/6245* (2013.01); *G06T 7/20* (2013.01); *G06T 7/70* (2017.01); *G06V 40/166* (2022.01); *G06V 40/173* (2022.01); *G06V 40/40* (2022.01); *G06V 40/50* (2022.01); *H04N 5/76* (2013.01);
(Continued)

(58) Field of Classification Search
CPC ....... G06F 21/32; G06F 21/6245; G06T 7/70; G06T 7/20; G06T 2207/10016; G06T 2207/30201; G06V 40/173; G06V 40/40; G06V 40/166; G06V 40/50; H04N 5/76
See application file for complete search history.

(56) References Cited

U.S. PATENT DOCUMENTS 8,922,480 B1 * 12/2014 Freed ............... G06F 3/0304
                                                    382/103
10,796,178 B2   10/2020 Fan et al.
(Continued)

*Primary Examiner* — William R Korzuch
*Assistant Examiner* — Forrest L Carey
(74) *Attorney, Agent, or Firm* — Tarolli, Sundheim, Covell & Tummino LLP

(57) ABSTRACT

A method of maintaining the security of an authentication session comprises operating a camera device to continuously capture a view of an environment of a computing device, performing face detection to detect all faces in the environment, performing comparisons between faces detected in the environment and faces of a set of authorized users, at a first time, detecting a first face of an authorized user of the set in the view of the environment and, in response, allowing the authorized user to operate the computing device, and at a second time after the first time, one of failing to detect the first face or detecting a second face that is not of an authorized user of the set in the view of the environment, and, in response, at least partially blocking operator access to input and output devices including blocking a display of the computing device.

22 Claims, 8 Drawing Sheets

(51) Int. Cl.
  *G06T 7/20* (2017.01)
  *G06T 7/70* (2017.01)
  *G06V 40/16* (2022.01)
  *G06V 40/40* (2022.01)
  *G06V 40/50* (2022.01)
  *H04N 5/76* (2006.01)

(52) U.S. Cl.
  CPC .............. *G06T 2207/10016* (2013.01); *G06T 2207/30201* (2013.01)

(56) References Cited

U.S. PATENT DOCUMENTS

| | | | |
|---|---|---|---|
| 11,527,107 B1* | 12/2022 | Mostafa | G06V 10/751 |
| 11,863,552 B1* | 1/2024 | Rao | H04L 63/0861 |
| 2011/0289564 A1 | 11/2011 | Archer et al. | |
| 2014/0197922 A1 | 7/2014 | Stanwood et al. | |
| 2015/0033304 A1* | 1/2015 | Fujiwara | G06V 40/171 |
| | | | 726/6 |
| 2017/0083755 A1 | 3/2017 | Tang et al. | |
| 2018/0204053 A1* | 7/2018 | Yokozeki | G06T 7/20 |
| 2019/0246075 A1* | 8/2019 | Khadloya | G06V 40/10 |
| 2020/0320184 A1* | 10/2020 | Nikitidis | H04W 12/68 |
| 2021/0056292 A1* | 2/2021 | Mao | G06N 3/045 |
| 2021/0314526 A1* | 10/2021 | Astarabadi | H04L 9/0819 |
| 2022/0414382 A1* | 12/2022 | Xiong | H04N 7/181 |
| 2023/0049550 A1* | 2/2023 | Roy | G06F 18/213 |
| 2023/0222842 A1* | 7/2023 | Hua | G06V 40/45 |
| | | | 382/181 |
| 2023/0368575 A1* | 11/2023 | Chen | G06F 18/253 |

* cited by examiner

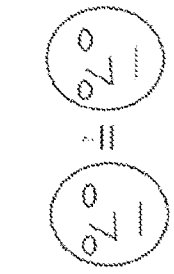
FIG. 3A
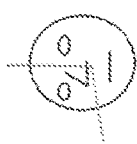
FIG. 3B
FIG. 3C
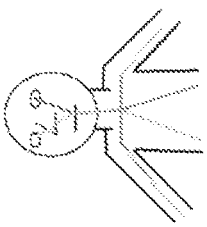
FIG. 3D
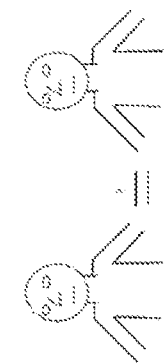
FIG. 3E

| Assigned track states | | Priority Intruder | | Priority Authorized | |
|---|---|---|---|---|---|
| Track states | Scene States | Counter updates | | Scene States | Counter updates |
| Authorized | | AUTHORIZED | | | AUTHORIZED |
| Intruder | INTRUDER | Intruder counter +1 | | INTRUDER | Intruder counter +1 |
| Unverified | UNVERIFIED | Unverified counter +1 | | UNVERIFIED | Unverified counter +1 |
| Authorized, Intruder | INTRUDER | Intruder counter +1 | | AUTHORIZED | |
| Authorized, Unverified | AUTHORIZED | | | AUTHORIZED | |
| Intruder, Unverified | INTRUDER | Unverified counter +1 | | INTRUDER | Unverified counter +1 |
| Authorized, Intruder, Unverified | INTRUDER | Intruder counter +1 | | AUTHORIZED | |
| | | Unverified counter +1 | | | |

*FIG. 7*

SYSTEM AND METHOD FOR CONTINUOUS PRIVACY-PRESERVING FACIAL-BASED AUTHENTICATION AND FEEDBACK

CROSS-REFERENCE TO RELATED APPLICATIONS

This application claims priority under 35 U.S.C. § 119 to U.S. Provisional Patent Application Ser. No. 63/271,140, titled "SYSTEM AND METHOD FOR CONTINUOUS PRIVACY-PRESERVING FACIAL-BASED AUTHENTICATION AND FEEDBACK," filed Oct. 23, 2021, the entire contents of which is incorporated herein by reference for all purposes.

TECHNICAL FIELD

The presently disclosed subject matter generally relates to the field of user authentication and session security for electronic devices. More particularly, the present disclosure relates to systems and methods for biometric access control to electronic devices on a continuous or semi-continuous basis.

BACKGROUND

The most common interaction with an authentication mechanism for an electronic device is when a user enters their password to log into a computer, mobile device, or a website. The user may enter the password once, it is authenticated by the operating system ("OS"), and then a user session is unlocked. The session may remain unlocked until it goes into sleep mode due to inactivity for a certain period of time or until the user locks or logs out explicitly.

In a less common, but ever-increasing fashion, two-step authentication may be used to unlock a user session on an electronic device. In these cases, a user provides a second authentication factor, for example, a physical device, a one-time passcode, or a biometric pattern. What all these authentication solutions have in common is that they authenticate the user only once, at the unlocking phase. Once successfully authenticated, there are no further restrictions or controls on access to the device resources to protect against unauthorized access except for limited number of administrative tasks that occasionally might require re-authentication of the user.

Security issues may arise if a user leaves their unlocked computer or other device or system unattended. The computer may not know that a person who accesses the user session after an initial login is the same person using the computer who authenticated on the login screen, or another person who has come across an unlocked and unattended computer. This may be a particular concern if that computer is in a hospital where private patient records are stored or in a bank or financial institution with access to millions of bank accounts, if the computer is an unattended computer in a police car, or if the computer is that of a government employee with access to confidential information.

SUMMARY

Aspects and embodiments disclosed herein provide for an organization to implement robust security policies that go beyond first and only authentication; to ensure that data is not compromised at the endpoint most often abused for network security—the person using the computer.

In accordance with one aspect, there is provided a method of maintaining the security of an authentication session. The method comprises operating a camera device to continuously capture a view of an environment of a computing device, performing face detection to detect all faces in the environment, performing comparisons between faces detected in the environment and faces of a set of authorized users, at a first time, detecting a first face of an authorized user of the set in the view of the environment and, in response, allowing the authorized user to operate the computing device, and at a second time after the first time, one of failing to detect the first face or detecting a second face that is not of an authorized user of the set in the view of the environment, and, in response, at least partially blocking operator access to input and output devices including blocking a display of the computing device.

In some embodiments, blocking the display of the computing device includes one of displaying a popup window that blocks the view of the screen or blurring the screen.

In some embodiments, blocking the display of the computing device includes displaying an advertisement on the display.

In some embodiments, the method further comprises unblocking operation of the computing device responsive to the detecting the first face in the view of the environment subsequent to failing to detect the first face in the view of the environment.

In some embodiments, unblocking operation of the computing device is contingent on not detecting the second face in the view of the environment.

In some embodiments, the method further comprises sending an alert to another computing device responsive to one of failing to detect the first face or detecting the second face in the view of the environment.

In some embodiments, the method further comprises maintaining a record of faces in the view of the environment.

In some embodiments, the method further comprises recording a video of the second face when the second face is in view of the environment.

In some embodiments, performing the comparisons includes performing pose estimation to obtain a difference vector and performing a cosine difference calculation between a face in the view of the environment and a face of authorized user of the computing device.

In some embodiments, the method further comprises using a tracking algorithm to correlate history of a location of a face in the view of the environment across a time vector and using prior recognitions of the face to adjust thresholds and allow detection when the face is not fully visible or not at correct angles required for detection.

In some embodiments, the comparisons between faces detected in the environment and the faces of the set of authorized users are performed multiple times per second.

In some embodiments, the comparisons between faces detected in the environment and the faces of the set of authorized users are performed in every frame of video captured by the camera device.

In some embodiments, geospatial data about faces of the set of authorized users that uniquely identifies the faces are stored locally only locally on the computing device.

In some embodiments, geospatial data about faces of the set of authorized users that uniquely identifies the faces are encrypted and shared between multiple computing devices connected within a local private network.

In some embodiments, the method is utilized independently of an initial form of user authentication that initially unlocks the computing device.

In some embodiments, the method further comprises registering an authorized user with the computing device by building and storing a record of geospatial data about the face of the authorized user using video frames of the face from different angles captured by the camera device.

In some embodiments, the method further comprises updating the stored record when a positive identification of the user is made to add alternative poses and improve future face matching effectiveness.

In some embodiments, the method further comprises building the update to the stored record from video frames of the face from different angles captured by the camera device.

In some embodiments, the method further comprises assessing environmental variables in the view of the environment and adjusting detection thresholds for performing a positive detection of faces in the view of the environment responsive to the environmental variables.

In some embodiments, the method further comprises detecting and preventing spoofing by using vector of time to detect movement in head pose and features of the face over a time period to prevent 2D attacks.

In some embodiments, the method further comprises using an alternative AI model that utilizes more processing power than the method of claim 1 in exchange for providing higher accuracy of face re-identification, that is leveraged with less frequency to validate and allows reinforcement learning and online improvement for the method of claim 1.

In accordance with another aspect, there is provided a non-transitory computer readable media having instructions encoded thereon, which when executed by a computer processor causes the computer processor to perform a method comprising operating a camera device to continuously capture a view of an environment of a computing device, performing face detection to detect all faces in the environment, performing comparisons between faces detected in the environment and faces of a set of authorized users, at a first time, detecting a first face of an authorized user of the set in the view of the environment and, in response, allowing the authorized user to operate the computing device, and at a second time after the first time, one of failing to detect the first face or detecting a second face that is not of an authorized user of the set in the view of the environment, and, in response, at least partially blocking operation of the computing device.

BRIEF DESCRIPTION OF THE DRAWINGS

The foregoing summary, as well as the following detailed description of various embodiments, is better understood when read in conjunction with the drawings provided herein. For the purposes of illustration, there is shown in the drawings exemplary embodiments; however, the presently disclosed subject matter is not limited to the specific methods and instrumentalities disclosed.

FIG. 3A represents a face detection algorithm;
FIG. 3B represents a head pose estimation model;
FIG. 3C represents a face re-identification model;
FIG. 3D represents a human pose estimation model;
FIG. 3E represents a person re-identification model.

FIG. 7 is a table illustrating conditions for updating of scene states.

DETAILED DESCRIPTION

Figure 1:
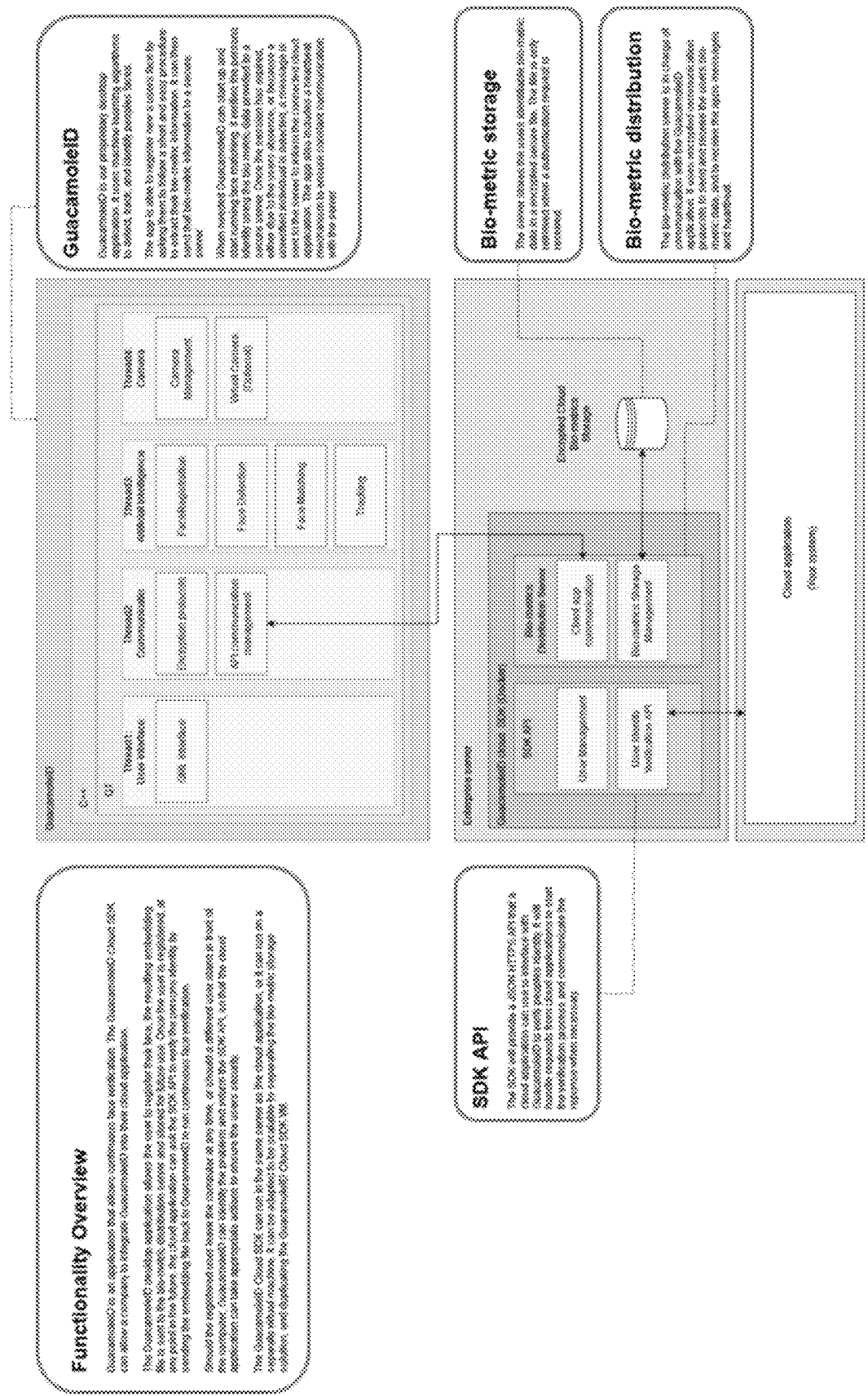
FIG. 1 is an example functionality overview of a system and method for biometric user authentication as disclosed herein.

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

As used herein, a device or a module may refer to a device or combination of devices that may include hardware, software, firmware, or combination of these. The module may be machine-implemented instructions.

Furthermore, the described features, structures, or characteristics may be combined in any suitable manner in one or more embodiments. In the following description, numerous specific details are provided, to provide a thorough understanding of embodiments of the disclosed subject matter. One skilled in the relevant art will recognize, however, that the disclosed subject matter can be practiced without one or more of the specific details, or with other methods, components, materials, etc. In other instances, well-known structures, materials, or operations are not shown or described in detail to avoid obscuring aspects of the disclosed subject matter.

All numeric values are herein assumed to be modified by the term "about," whether or not explicitly indicated. The term "about" generally refers to a range of numbers that one of skill in the art would consider equivalent to the recited value (i.e., having the same or substantially the same function or result). In many instances, the terms "about" may include numbers that are rounded to the nearest significant figure. The recitation of numerical ranges by endpoints includes all numbers within that range (e.g., 1 to 5 includes 1, 1.1, 1.01, 1.05, 1.2, 1.08, 1.3, 1.4, 1.5, 1.6, 1.7.1.8, 1.9, 2, 2.75, 3, 3.80, 4, and 5).

The following detailed description should be read with reference to the drawings, in which similar elements in different drawings are identified with the same reference numbers. The drawings, which are not necessarily to scale, depict illustrative embodiments and are not intended to limit the scope of the disclosure.

It is to be understood that both the foregoing general description and the following detailed description are exemplary and explanatory only, and are not restrictive of the invention, as claimed. In this application, the use of the singular includes the plural, the word "a" or "an" means "at least one," and the use of "or" means "and/or," unless specifically stated otherwise. Furthermore, the use of the term "including," as well as other forms, such as "includes" and "included," is not limiting. Also, terms such as "element" or "component" encompass both elements and components comprising one unit and elements or components that comprise more than one unit unless specifically stated otherwise.

Continuous identity verification (CIV) is a mechanism that frequently (continuously or semi-continuously) verifies a user's authenticity after they have logged in to a computer, workstation, or other electronic device, all of which are encompassed by the general term "device" herein, for the entire duration of the computing session. Continuous identity verification targets a large risk factor in computer security—the people who leave their workstations unlocked and unattended. It protects against tailgating—the takeover of an unlocked computer by another person (unattended terminal takeover) when a user goes to lunch or a meeting. It also protects against piggybacking—when a user knowingly gives an unauthorized person access to their system/session. It also prevents those who look over the user's shoulder (shoulder-surfing) to be able to read sensitive information being accessed by the user.

Aspects and embodiments of systems and methods disclosed herein, referred to as "Guacamole ID" use continuous or semi-continuous biometric matching, for example, facial recognition/facial matching to ensure that the verified user is still present after initial log into to their device and locks the session if the user leaves, or if an unauthorized person is detected looking at the device screen. It should be understood that that the terms "continuous" or "semi-continuous" may include biometric matching that is performed either continuously or in a periodic manner more than once after an initial log-in to a device, for example, multiple times a second, between every second and every minute, for every frame (or every 2-5 or other small number of frames) of video captured by a video-capture device of the electronic device. A user's device may be locked if the continuous or semicontinuous biometric authentication fails, for example, if a user leaves their device or an unauthorized user appears in a position in which they may view the screen of the device. Once the authorized user comes back or the unauthorized person leaves the front of the screen, the device may be automatically unlocked.

System Overview:

Aspects and embodiments of systems and methods disclosed herein leverage novel visual analytic technology for personal device access and background monitoring. These aspects and embodiments use video footage captured from the front-facing camera or webcam of a device, and use this footage to search for faces. The system uses known face recognition technologies to verify that all individuals looking at the screen of a device are among the list of authorized users by verifying their facial biometrics. In some embodiments, all required processing may be performed in a user's device, using an existing off-the-shelf webcam for image capture of faces.

In some implementations, no video will be generated, saved, or sent anywhere outside the user's device. Optionally, for some use cases, a short video of the suspicious activities mentioned above (such as tailgating, piggybacking, or shoulder-surfing) will be generated. In some embodiments, the video footage will be encrypted and can be stored on the user's computer (both the standalone and connected versions of GuacamoleID) or on a server (in the connected version of GuacamoleID). The server can be deployed locally or remotely, therefore there is no need to transfer the videos to the cloud or outside of the user's company's Virtual Private Network (VPN). The system will also benefit from a company's existing VPN, since it ensures secure, encrypted communication between the user's device and the server.

Depending on the client's policy, the authorization for adding new faces may have three levels. A first of these levels is a "User-admin" authorization level in which the user can add users to the list of authorized users to the system. In a "Supervisor-admin" authorization level the user's supervisor or the user's company's IT team is the only one who can add authorized users to the list of authorized users to the system for each device. In a "Hybrid-admin" authorization level the user can request for additional users to be added to the list of authorized users, but the supervisor or IT team needs to review and approve them.

The system can also work in three modes. In a Standalone (User-admin) mode the user downloads the software in his/her device to ensure that only the authorized users are able to see the screen at all times. If an unauthorized user is detected, the device is automatically locked. In the case that the user opts for saving videos, the video footage of suspicious activity is generated, encrypted and stored in the local device. A Connected (Supervisor-admin, User-admin, Hybrid) mode includes the properties of the Standalone mode, plus a supervisor platform. The supervisor platform is accessed by the user's supervisor/IT teams and provides detailed information about access and authentications across all assigned users' devices. In addition, GuacamoleID comes with a software development kit (SDK) that can be integrated with other platforms, softwares, browsers or websites (referred to as a third party herein) as an additional security layer tool (e.g., continuous authentication). In this case, the system operates under an SDK mode wherein the third party will call the GuacamoleID SDK during login and the GuacamoleID SDK gets access to the webcam/camera and secures the third party platform through continuous authentication.

An example functionality overview of the GuacamoleID system/method is provided in FIG. 1. As illustrated and described in FIG. 1, GuacamoleID is a desktop application ("app") that uses machine learning algorithms to detect, track, and identify people's faces. The app is able to register a new user's face by asking them to follow a short and easy procedure to extract their biometric information. It can then send that biometric information to a secure server. When needed, GuacamoleID can start up and start running the face matching. It verifies the person's identity using the biometric data provided by a secure server. One the session has expired, either due to the user's absence, or because an unverified individual is detected, a message is sent to the server to inform the connected cloud application. The app also includes a heartbeat mechanism to ensure constant communication with the server.

GuacamoleID provides for continuous face recognition. The GuacamoleID Cloud SDK can allow a company to integrate GuacamoleID into their cloud application. The GuacamoleID desktop application allows the user to register their face. The resulting embedding file is sent to the biometric distribution server and stored for future use. One the user is registered, at any point in the future, the cloud application can ask the SDK API to verify the person's identity by sending the embedding file back to GuacamoleID to run the continuous face verification. Should the registered user leave the computer at any time, or should a different user stand in front of the computer, GuacamoleID can identify the problem and take appropriate actions to ensure the user's security. The GuacamoleID cloud SDK can run in the same server as the cloud application, or it can run on a separate virtual machine ("VM"). It can be adapted to be scalable by separating the biometric storage solution, and duplicating the GuacamoleID Cloud SDK VM.

The SDK will provide a JSON HTTPS API that a cloud application can use to interface with GuacamoleID to verify peoples' identity. It will handle requests from cloud applications to start the verification process and communicate the response when necessary.

GuacamoleID may utilize a server to store users' identifiable facial biometric data in an encrypted secure file and make them available to trusted applications in the same trusted network using encrypted communication. This will enable users to use different workstations in the organization without the need to register their faces in every workstation separately. The same server architecture can be used to enforce configuration via a central management system throughout the participating applications on the workstations of the organization.

Figure 2:
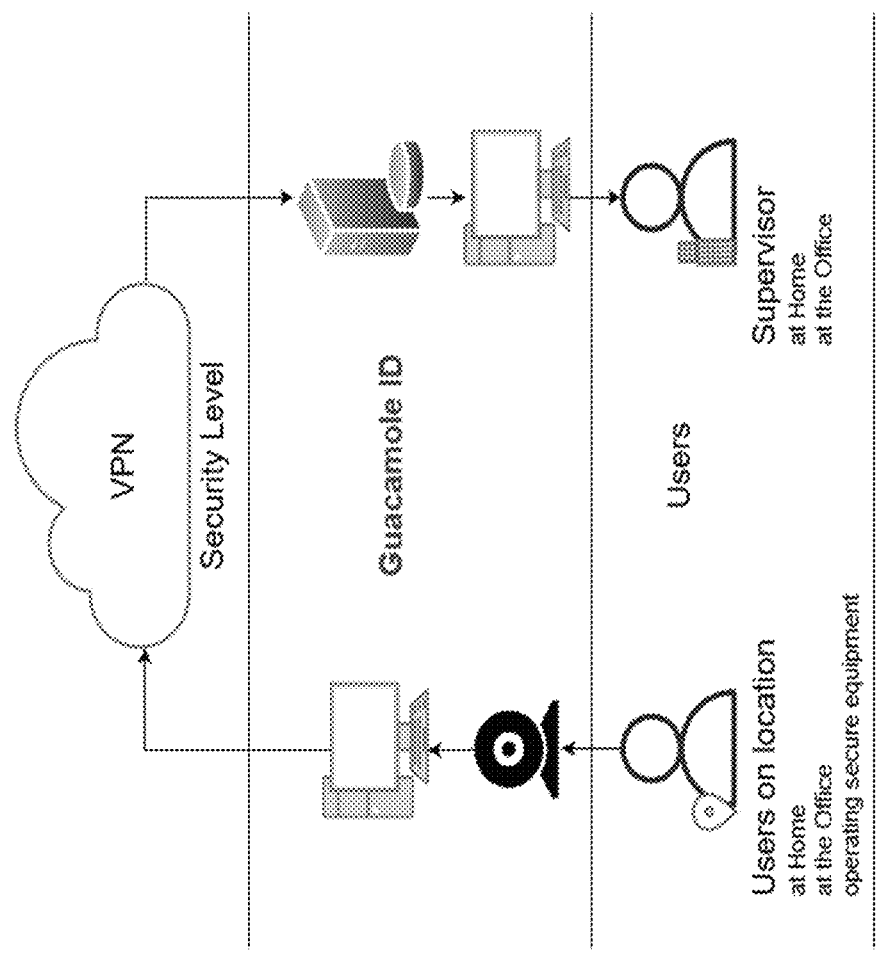
FIG. 2 is a diagram of an example of a communications flow for embodiments of a system and method for biometric user authentication as disclosed herein.

All the communication between user's device, server, and software are established within the clients' VPN network to ensure encrypted communication between the user's device and the supervisor's computer. FIG. 2 is a diagram of an example of a communications flow for embodiments of GuacamoleID.

GuacamoleID will be available, but not limited, to devices including workstation computers, laptops, smartphones, and tablets and operating system including Microsoft Windows®, Apple macOS®, Linux, Android, and Apple's iOS® operating systems.

GuacamoleID can also work in two ways. In a Constant mode of operation, as soon as the user logs in into his/her device, GuacamoleID will start running in the background, by default (operating system protection mode). In a Temporary mode of operation, GuacamoleID (using SDK) can provide a similar security and protection whilst a specific document is accessed for view or a certain application is available for interaction (application specific protection mode). GuacamoleID may operate independently of the existing Single Sign On (SSO) process and technology for a device to keep a user-authenticated session active instead of replacing the core authentication.

One process of the GuacamoleID software is responsible for detecting peoples' faces, detecting the orientation of faces, and using face recognition tools to verify each person's identity. If the system detects an unauthorized face (and/or the absence of an authorized face), it blurs and/or locks the screen of the device in question to prevent any potential misuse of data or the system. In some embodiments, advertisements may be displayed on the screen of a device that has been locked. The GuacamoleID software may track viewing, e.g., how many times, for how long an advertisement is viewed, an/or identity or demographic information about persons who have viewed the advertisements to aid in monetizing the advertisement display.

GuacamoleID has a notification feature to alert the user and/or the supervisor/IT team about potential breach incidents.

In the case of the Standalone version, GuacamoleID immediately notifies the authorized registered user of the device regarding the breach of access. The notification can happen in the form of a pop-up message, text message or an e-mail. Optionally, in the GuacamoleID version with recording capability, GuacamoleID also records and stores the corresponding video footage. The corresponding video footage is stored on the local storage of the user's device (laptop or workstation hard-drive).

In the connected operation mode, the notification is shown in real time by changing the color of the icon of each user on a dashboard accessible by a supervisor, security, system admin, or IT team. Optionally, in the GuacamoleID version with recording capability, the software compresses the recorded footage and sends a copy to the server computer located in the office of the supervisor or system admin for additional review. Simultaneously, the supervisor/IT team may take preventive action to reduce the probability of information leaking by manually locking the user's device remotely. All the recorded videos may be encrypted.

Feedback Process

In the connected mode, the dashboard of the GuacamoleID platform, which runs on the local server dedicated to the supervisor, provides detailed information about access and authentications across all assigned users' devices. The dashboard provides a dedicated icon with different coloring to provide continuous authentication feedback per each user's device. The supervisor's dashboard continuously receives the access information from the users' devices and based on the access information (authorized face vs. unauthorized face), it changes the color of the dedicated icon per each device. For example, if the user's app running on the device detects that an unauthorized person is accessing a user's device the system can show an alert in the supervisor's dashboard. Optionally, in the GuacamoleID version with recording capability, the supervisor has a chance to review and analyze the video footage related to unauthorized access. He/she can clear or mark unauthorized access with respect to the context. The cleared videos will be removed from the reference. However, the system stores a backup of all unauthorized video footage stored in the local supervisor's server for future reference for a certain period of time Aspects and embodiments of GuacamoleID system include three main components: a video-capture device, the GuacamoleID Software, and Artificial Intelligence (AI).

Video-Capture Device

The first component—The video-capture device—acts as the system's eyes. The devices are watching the workplace all shift long and may monitor not just the user but also his surrounding environment. By the end of the user's working hours, or ending of the work session, the software is turned off and it can be paused by the user. GuacamoleID may utilize integrated laptop/computer webcams as the video capture device. In the case that no integrated webcam is available, regular USB webcams may be utilized as video capture devices. GuacamoleID can also work with the majority of cameras that are in the market, if they have Real Time Streaming Protocol (RTSP) streaming capabilities. In the case of external webcams, the webcam is installed in the front view.

In some embodiments, GuacamoleID can work with not only one camera, but two or multiple cameras to have a more robust view of the person and his/her environment.

In some embodiments, GuacamoleID uses the video-capture device to build a three-dimensional representation of an authorized user's face for use in comparison to an image of the face of a user captured by the video-capture to determine if the user whose face is imaged is the authorized user. If a particular video-capture device is incapable of capturing a three dimensional image of a user's face, vector of time methodology may be utilized in which two dimensional images of the user's face are captured at different time periods and combined to form the three-dimensional representation utilizing, for example, commercially available photogrammetry software. Ongoing evaluation of captured facial embeddings during verification processes may be performed and better quality face image representations may replace poorer quality existing facial embedding captured during the initial face registration process or during prior verification processes. In some embodiments, GuacamoleID may utilize tracking technology, to positively verify the person and track a user, so images of the user's face from different angles can be captured to improve the reference facial embedding for that user. Such a methodology may also be utilized during the initial registration process for the user so the user does not need to be explicitly instructed to look in different directions so images of their face from different angles could be captured.

Guacamole Software

After a user installs the GuacamoleID software on their device, and after entering credentials and entering the account, the user will register their face so the software can recognize them.

There are two versions of the Guacamole software: Standalone & Connected. On the Connected version platform there are two administrative levels: supervisor (viewer) and super-admin (editor). The Guacamole for Standalone version is responsible for AI processing, guiding users in installation, and local data storage. Optionally, this software records videos using the webcam during a security breach and only in the connected mode, sends these videos to the supervisor. The Guacamole for Connected version (supervisor) is a user interface to show security breaches in users' devices in a color-coded manner and only in the case of the version with recording capability, gives access to supervisors to further investigate videos reported by the AI. The dashboard can also generate reports. This software can also be used by a super-admin to assign users to supervisors, and data analysis.

In various embodiments, all processing for major AI tasks, such as face detection, head pose estimation, human pose estimation, face re-identification, and person re-identification is performed on the user's local device. Optionally, if a security breach is detected, the software will forward a video to the server for the supervisor to review. Alternatively, the processing may be performed in a cloud computing environment as discussed above.

Artificial Intelligence

The third component—AI—acts as an expert supervisor's brain. The AI includes five main components: face detection allows the system to detect and locate faces in the camera frame, head pose estimation allows the system to estimate in which direction the person's face is facing, human pose estimation, person re-identification, and finally face re-identification allows GuacamoleID to compare previously stored values calculated from the authorized users' faces with the current user of the computer to verify their identity. Each of these algorithms may operate on a neural network such as MobileNetV2, referenced above, that is initially trained using images from, for example, ImageNet in accordance with known neural net training methods to perform the tasks associated with each of these algorithms.

The AI may analyze every frame of every single workspace footage. It uses deep learning algorithms to learn from day to day operations and behaviors seeking potential security breaches (federated learning): Each one of the nodes (GuacamoleID installations in a distinct device) is continuously, independently, and without sharing data with other nodes, being evaluated by its embedded decision maker to assess the performance of models in real-time and periodically adjust the parameters of the five other AI models below based on the environmental condition and users behavior. This internal decision maker is referred to herein as BEL. For example, if the face detection algorithm is not performing with satisfying performance for user A, but it may work well for user B in similar lighting conditions. BEL may adjust the parameters of this algorithm, such as its threshold, in user A's computer.

(1) Face Detection (FIG. 3A): For the task of face detection, GuacamoleID uses a model based on MobileNetV2 as a backbone with a Single Shot Multibox Detector (SSD) head for scenes shot by a front-facing camera. The input frame of the model is resized from the original image captured from the source and is normalized using the mean and std from ImageNet, a large databases of reference images for training image recognition in AI models. The model outputs the bounding boxes of every face detected along with its detection probability. After gathering the bounding boxes of the selected faces, the portion corresponding to each face is cropped and resized accordingly for use as input in the face pose estimation and re-identification steps.

The general face detection system and process is based on a continuous re-identification process that integrates the face matching steps within a face tracker such as the simple online and real time tracking with a deep association metric algorithm, also known as DeepS ORT. A tracker such as DeepSORT allows GuacamoleID to track each detection over time by performing a series of updates to the identifiers of each track through a matching cascade that incorporates the distance between the features of the reidentification model as an element that allows associating tracks of different moments from each other. In some embodiments, if the face tracker does not detect significant movement or change of a user's face over time, this may be indicative of a high probability that the face of the user being detected during one time period is that of the same user detected during a previous time period. A threshold for determining that the user is the same user that was previously authenticated may thus be lowered and/or a reduced amount of computational resources (e.g., number of identified points of features on the user's face and/or spatial relationships between these points or features analyzed) may be utilized if the user's face has not moved significantly, for example, remaining fully within the vision-capture device field of view over the time period. Similarly, if the user's face only partially moves outside of the vision-capture field of view or if the user turns their head while their head remains within the vision-capture device field of view, reduced computation resources may be allocated to re-identification of the user as compared to an instance in which the user's face moves entirely out of the field of view of the vision-capture device and then returns or if another user's face appears within the vision-capture device field of view.

In various embodiments, the following elements are added to the conventional DeepS ORT algorithm:
  (A) States:
    (i) Scene state: A scene describes what happens inside the application. The possible states defined for a surveillance scene are ABSENT, INTRUDER, AUTHORIZED.
    (ii) Matching state: Each track has a status that depends on the face matching process of that track. The status may be Unverified, Identified, and Intruder which is associated depending on the face matching result in each update of the tracking algorithm.

Figure 4:
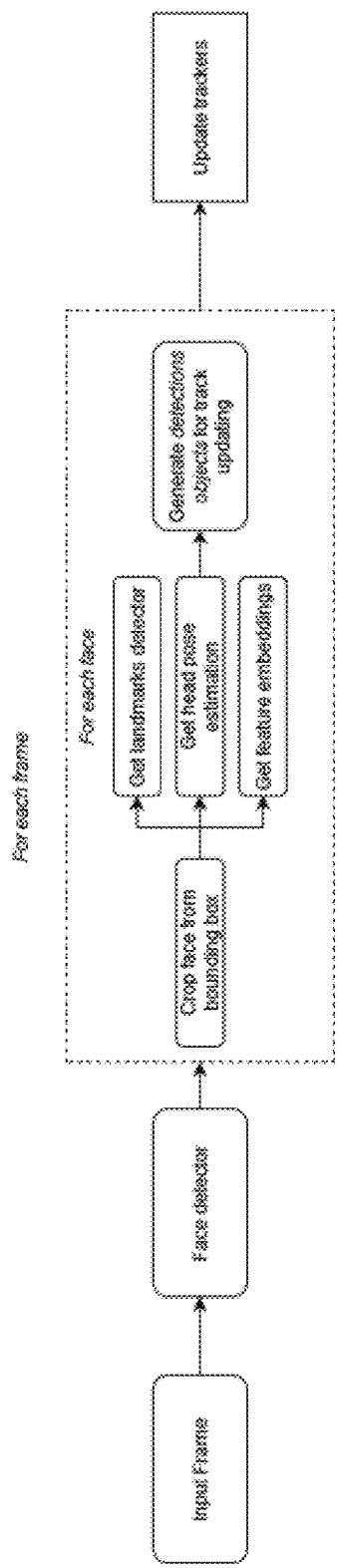
FIG. 4 is a flow diagram of creation of detection objects.

(B) Detection object: A detection object is an object that represents a face detected in the scene. A detection object contains the coordinates of the location of the face together with the confidence delivered by the facial detection model (bounding box), along with the landmarks, head pose angles and feature embeddings detected in a single frame by the re-identification model. The collection of all detection objects in a frame are used to update the scene tracker and all of the track states. FIG. 4 is a flow diagram of creation of detection objects.

Detection objects consist of:
(i) Face bounding box: A vector that represents the coordinates of a rectangle that bounds the face and their confidence.
(ii) Face feature embeddings: To perform the face re-identification of individuals, a vector description of the face of each individual is extracted by using a face re-identification model that produces vectors which are close in cosine distance for faces belonging to similar faces and far for faces that are different. This way, it is possible to set a threshold over which we consider two different faces as belonging to the same identity or not.
(iii) Head pose and facial landmarks: For every face detected, an estimation of the head pose is performed with the purpose of only processing faces with proper alignments to have face embeddings of enough quality. The landmarks are used to align the face automatically for the face re-identification to work under optimal alignment conditions.

(C) Counters:

Counters provide a historical vector of time factor into decision making. It allows the application to be robust and less sensitive to noise or brief disruptions of the continuum. For example, if GuacamoleID is identifying a person, and some of the frames are not resulting in a match, e.g., changing light or something passing in front of the face, the counter allows the decision making process to know the confidence level. If 80% of the frames resulted in positive identification, there is no need to waste computation on digging further into the remaining 20% of the frames. But if just a single frame suggested identification, it might be an accidental match that should be evaluated further.
(i) Intrusion counter: It is a counter that exists within each track and allows knowing in how many updates of the tracking algorithm a track has had a maximum average cosine similarity value of less than 0.25 with respect to registered users.
(ii) Absence counter: Counter that allows knowing in how many updates of the tracking algorithm no face has been detected. Once the absence counter crosses a certain threshold that depends on the sensitivity level of the system, the general state of the scene will be identified as ABSENT.
(iii) Duplicity counter: Counter that allows knowing how many updates of the tracking algorithm include several tracks that have been associated with the same user.

Algorithmic Features

The GuacamoleID continuous re-identification system utilizes different features to provide robustness and stability through different scenarios and conditions. A continuous assessment of environmental variables is performed to address ill conditioned scenes. This environmental assessment also allows the system to adjust internal parameters, such as threshold in face matching and the number of frames required for a track to meet the matching thresholds in real-time.

(A) A Quality Assessment Stage is provided to guarantee that the face feature embeddings obtained in every tracker update are reliable. This stage has three parts:
(i) Image quality evaluation: Images are evaluated for blurriness, luminance estimate, and presence of overexposed spots in the image. All of these values are compared to preset threshold values calibrated with exemplary images that allow to estimate a tentative good image quality thresholding.
(ii) Realizing an estimate of the pose of the face is used, described as a vector indicating its yaw, pitch and roll orientation. These angles must be inside an interval that will be related to how centered a face is. Whenever a face is tilted too much so that it can't be properly identified, the face won't be able to be matched in the track matching stage and the track associated to this detection will be unverified.
(iii) Estimating facial landmarks to verify that the face has all the characteristics required by the model to perform an appropriate pose alignment.

Figure 5:
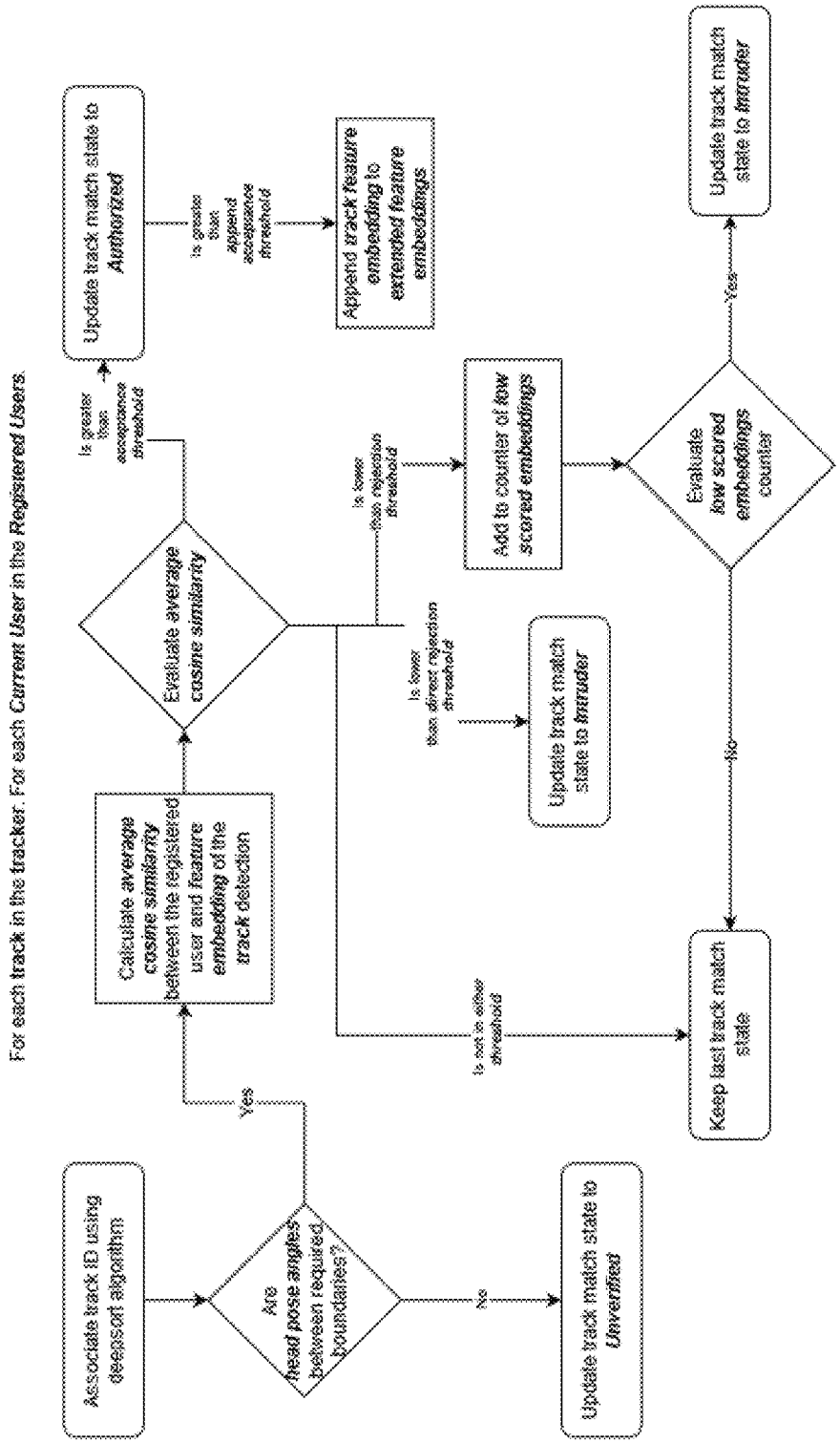
FIG. 5 is a flow diagram of a face matching algorithm.

(B) Matching stage for each track. During the update, an average of the cosine similarity between the registered embeddings and the embedding corresponding to the detection within the update is obtained. This average value will be compared with an acceptance threshold that will typically be between 0.65 and 0.75. To increase the robustness of the similarity comparison of the face reidentification, the feature embeddings in a track whose cosine similarity are higher than the append acceptance threshold are appended to the extended feature embeddings, which are used as an extension of the registered feature embeddings therefore the average score calculated in future is an average of both registered and extended feature embeddings associated with a registered user. FIG. 5 presents a flow diagram of face matching of each track.

Figure 6:
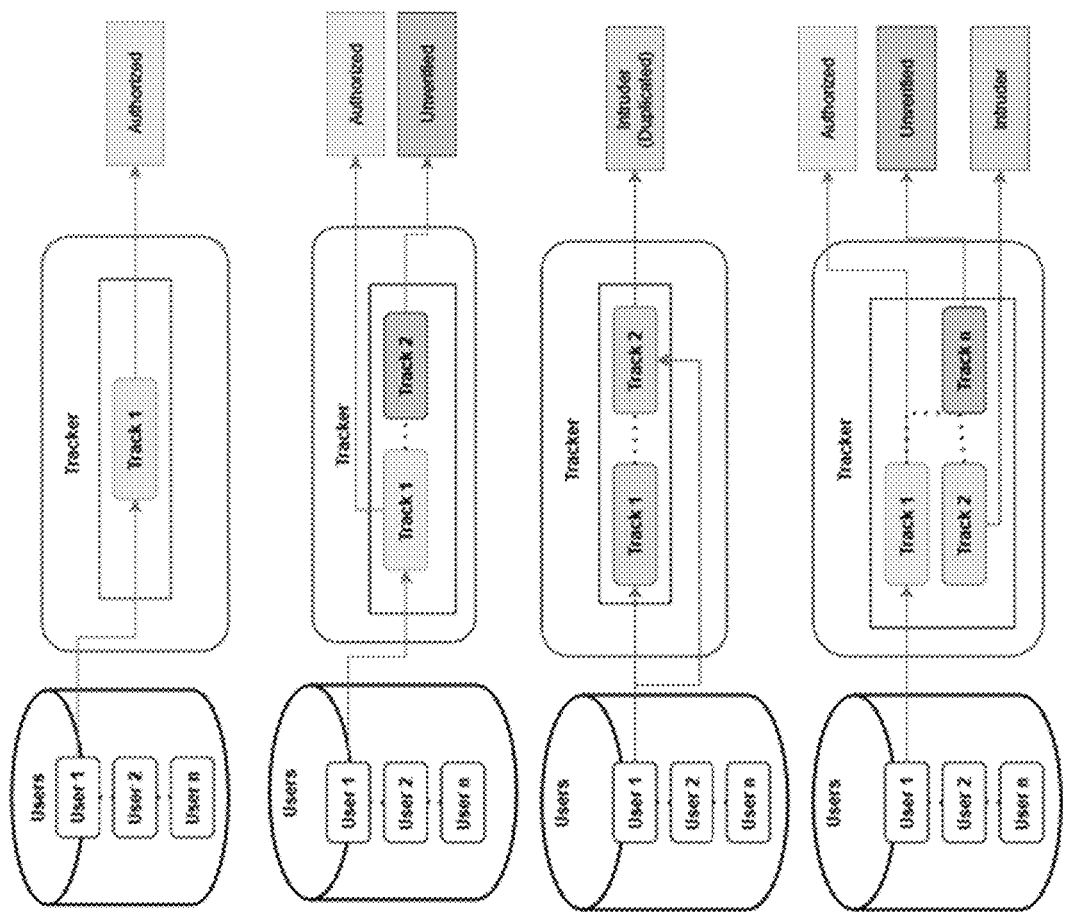
FIG. 6 illustrates types of possible associations for a tracker update.

FIG. 6 illustrates types of possible associations for a tracker update. A track can be authorized (green box) if it has been associated with a single authorized user in the update. It will be Unverified (gray box) if it did not meet Quality Assessment conditions or if the value of the similarity comparison wasn't in the acceptance or rejection thresholds. A track will be intruder if it was inside the rejection threshold.
(i) Acceptance threshold (Example: average similarity greater or equal to 0.65): If this threshold is exceeded, the track will be marked as authorized and will be associated with the user with whom the comparison gave the best value above the threshold.
(ii) Rejection threshold (Example: average similarity lesser or equal to 0.25):
If the average cosine similarity score of a track is in the rejection threshold, the intruder counter will be increased by one.

If the intruder counter of the track exceeds a defined amount according to the sensitivity level of the application, the track will be marked as belonging to an intruder, in a later update it may be unmarked as an intruder if it exceeds the acceptance threshold. If in a further update the score is in the acceptance threshold, the intruder counter will be reset, while if the score is not in either threshold, the counter will keep its last value.

If the value of the comparison is in another range different from those already mentioned, the track will be considered as not identified. After analyzing each track individually, all tracks may be associated with a user, associated with an intruder or be unidentified. In the event that two tracks are associated with the same user, one will be added to the duplicity counter.

(C) System of alerts and conditions. For each tracking update, the matching states of each track will be identified. Subsequently, the general state of the scene will be identified. GuacamoleID incorporates two possible policies for managing the states of the scene. These are: Priority of intruders and priority of authorized.
   (i) Intruder priority: When the system identifies intruders as a priority, the system will have the INTRUDER status whenever there is at least one intruder regardless of whether or not there are identified users at the scene.
   (ii) Authorized priority: When the system prioritizes authorized users, the system will have the AUTHORIZED status whenever there is at least one authorized user within a scene.

After an update of the tracking algorithm, the scene states will be updated as described in the table illustrated in FIG. 7.

(D) Optional robustness features included:
   (i) A composite face reidentification model made of a bulky and a lightweight face reidentification model can be enabled for particularly difficult situations. The bulky model runs with a lower frequency but provides a more robust measure of the facial cosine similarity. In certain specific cases, such as low lighting or high movement, this composition is used for low frequency tasks such as unblocking the screen of the user.
   (ii) Real time evaluation of algorithm parameters using reinforcement learning.

(2) Head Pose Estimation model (FIG. 3B): The head pose estimation model performs angle regression that retrieves the yaw, pitch and roll corresponding to each of the detected faces. Each cropped face is associated with an angle-based pose. In some embodiments, the facial pose detection model is based on a convolutional neural network (CNN) with a simple architecture, such that the regression layers are convolutions+Rectified Linear Unit (ReLU)+batch norm+fully connected output. The model input is the image that corresponds to the detected face of a person. The output is a vector that describes the pose of the face in terms of angular coordinates given by the yaw, pitch, and roll. Any model that allows a parameterization of the pose of the face can be useful as a substitute for the model described.

(3) Face Re-Identification model (FIG. 3C): The face re-identification model produces feature vectors which should be close in cosine distance for similar faces and far from different faces. In GuacamoleID, the information given by the pose estimation model is used to perform a comparison between similar posed faces to improve the robustness of the model when performing constant face re-identification. In some embodiments, this model is a lightweight CNN network which uses MobileNetV2 as a backbone and applies global depthwise pooling along with a 1×1 convolution to create the final 256 float embedding vector. The output embeddings are trained to be close in cosine distance for similar identities and far for different identities.

(4) Human Pose Estimation: The human pose estimation produces an output that corresponds to the graphical representation of the skeleton of a person in the scene. Each skeleton is described by the key points and the pairs. A person's skeleton would be analyzed to confirm their identity. For the human pose estimation model, there are several models that can be selected. In some embodiments, the model may be implemented in a multi-person 2D pose estimation network based on EfficientHRNet, which detects the human pose represented as keypoint and their connections. This model in particular, contains 17 keypoints for each individual. An alternative lightweight model can be selected, which is based in OpenPose with a tuned MobileNetV1 as features extractor. The representation of the skeleton is similar to the previous model, however this model contains 18 keypoints.

(5) Person Re-Identification model: The person re-identification model works similarly to face re-identification, though it uses images of the person's body instead of just their face. GuacamoleID would use this model to follow people around the scene and to avoid unnecessary security breach alerts. The person reidentification model, uses a whole body image, which can be obtained by an object detector trained to detect people in a scene, and it outputs an embedding vector similar to the one produced by the facial re-identification model. The output is a 256 floats vector and is also aimed to be compared through cosine distance.

A tracking model that uses IoU (Intersection over union) is integrated for performing spatial similarity sorting in order to complete information about the identification of users when re-identification confidence is low and the intersection of the boxes is certain on a given temporal delta.

Embodiments disclosed herein may utilize a customized version of the DeepSort algorithm since it is important to take into account that different identities can be mixed up with occlusion when performing a purely location based tracking based on IoU. DeepSort tracks objects not only based on the velocity, location and motion of the objects, but also by the similarity of the feature embeddings that are produced by each object. Every object is tracked and is associated with a track, which has a number ID and also a matched user ID. The matching process creates a temporal aggregate of the similarity scores of the track with respect to the potential users that the track belongs to. Each track has a status that depends on the face matching process of the track, this status is updated according to the result of the aggregate similarity comparison. The track matching stage consists of the track detection ensemble stage, which collects the required information for a track, such as the bounding box location and the facial descriptors, such as pose, landmarks and spoof score. Depending on these descriptors, the face goes into a quality assessment stage, where the face is verified to be appropriate enough for getting robust facial embedding. If the face outputs a facial embedding, then the track associated with the face is attempted to be matched with the registered users.

Each one of the AI algorithms may get feedback from BEL.

The AI-based methods and algorithms described above may be considered "Fast Path" methods. GuacamoleID may, in various embodiments, also utilize "Slow Path" methods and algorithms. The Slow path of the model is an alternative decision making AI model that utilizes a more resource intensive ArcFace based model. It improves the overall accuracy of every facial similarity comparison at expense of an increased CPU utilization and memory occupation. Using this model in a continuous way would have unaffordable effects on the overall performance of the system. Therefore, when enabled, this model runs at a lower frequency along with the base reidentification model.

In addition to the Fast Path and Slow Path methods/models, the various methods and algorithms disclosed above may also be implemented as composite models. A composite face reidentification model is made of a resource intensive ("Slow path") and a lightweight ("Fast path") face reidentification model. The ("Slow path") can be enabled for particularly difficult situations such as low light or low confidence matches.

The Slow Path model may be used with lower frequency due to limitations of computational resources but provides a more robust measure of the facial cosine similarity, while the Fast Path algorithms works as described previously and may be executed with high frequency and create the main decision-making pathway. In certain specific instances, such as low lighting or high movement, this composition is used for low frequency tasks such as unblocking the screen of the user.

In the composite model, if the result of the Slow Path matches the result of the Fast Path, the Fast Path model is rewarded and if the result of the Slow Path disagrees with the Fast Path, the Fast Path model is penalized. These rewards and penalties are used for reinforcement learning to continuously improve the Fast Path.

In decision logic, the final decision used when two models are compounded is a composite of the results of the two models, with increased weighting given to the more accurate model (i.e., the Slow Path).

Slow Path reinforcement is also used to adjust thresholds of identification for Fast Path, and the frequency of the Slow Path usage. The more reward is given, the less frequent the Slow Path will be used and the lower the threshold of the Fast Path can go, reflecting an emotion of confidence. Conversely, the more penalty is given by the Slow Path, the higher the frequency of engaging the Slow Path and the higher threshold for the Fast Path to reidentify a face, which is reflective of lowering of trust and confidence.

In addition to online learning, the disagreements of the Fast and Slow Paths can be collected with user consent in a central fashion to perform offline learning improvement of the Fast Path model that can be redistributed via software updates.

In some embodiments, a single device may be associated with a single authorized user. In tight working conditions where different people often move into and out of the field of view of a video-capture device of a user's device, this may lead to an unwanted amount of identification of Intruders and blocking or blurring of the screen of a user's device. Accordingly, GuacamoleID provides for operating in a local group mode in which trusted co-workers may be assigned trusted user status. The image of the face of a trusted user in the field of view of an authenticated user's device would not set off an alarm or alert or block or blur the screen of the authenticated user's device. This may be similar to operating in the "Authorized priority" mode described above. Additionally, a trusted user may be allowed to continue use of an authorized user's device after initial authentication of the authorized user (with or without the face of the authorized user remaining present in the field of view of the video-capture device) without having to perform re-authentication. In some embodiments, the facial profiles or registrations of different authorized and trusted users may be securely broadcast among a small group of user devices among the group of users in the tight working conditions to establish in each user device a record of who is the authorized user that is required to perform an initial sign-on authentication and who are the trusted users.

Use Cases:

Examples of use of GuacamoleID include but not limited to the following:

Mobile Devices (I-Pad, I-Phone, Smartphones, Tablets, Etc.)

When a user uses a mobile device, GuacamoleID authenticates the user's identity and enables access through continuous identity verification, such as through facial recognition. Moment by moment the GuacamoleID software continuously scans to make sure the user's face—and only the user's face or that of another an authorized person—has a view of the screen of the mobile device. This vigilant protection protects the user's privacy and information and blocks out threats. If an unauthorized face is captured looking at the user's screen, a warning sign pops up and blocks their view and alerts you. As soon as the authorized person leaves the front of the screen, the screen will be temporarily blurred, and as soon as the authorized user comes back, the screen will be instantly unblurred. In some embodiments, a video of the incident will be sent to a preferred preset server. The video may contain 3-4 seconds before the event that triggered the incident to 3-4 seconds after that. A user can also provide an e-mail address to receive notifications to alert the user if the user's device is being compromised.

Workstations/Terminals (Remote or Office Workforce)

When a user uses a working workstation, it doesn't matter if they are working remotely or at the office. GuacamoleID technology authenticates the user's identity and enables access through continuous facial recognition. Moment by moment GuacamoleID continuously scans to make sure the user's face—and only the user's face or the face of an authorized person— has a view of the screen of the user's device. This vigilant protection protects the user's privacy and information and blocks out threats.

If an unauthorized face is captured looking at the user's screen, a warning sign pops up to block their view and alert the user. As soon as the authorized person leaves the front of the screen, the screen will be temporarily blurred, and as soon as the authorized user comes back, the screen will be instantly unblurred. In some embodiments, the user can provide an e-mail address to receive notifications to alert the user if their device is being compromised. Also, the user's designated supervisor will receive an alert and a short (e.g., 3-5 second) video with the footage of the intruder. The user can register/deregister other coworkers/authorized people to the system efficiently in a few seconds.

ATMs

When using an ATM, GuacamoleID authenticates a user's identity and enables access through continuous facial recognition. Moment by moment GuacamoleID continuously scans to make sure the user's face—and only the user's face—has a view of the ATM screen. This vigilant protection protects the user's privacy and information and blocks out threats.

If the user walks away from the ATM or their face goes undetected, the ATM screen will automatically be blurred to prevent unauthorized persons from accessing the user's account. If this continues for more than a certain amount of time, e.g., a minute, the session will be terminated. If an unauthorized face is captured looking at the user's ATM screen, or looking over their shoulder, a warning sign pops up to block their view and alert the user.

If desired, a user can link their bank account with their biometrics (facial matching) so when using the ATM, the GuacamoleID software SDK will be called and makes sure that the right person is accessing the user's bank account. If the user's card is stolen and someone wants to use it in an ATM, GuacamoleID will recognize that the wrong person is behind the ATM and will automatically close the session. The user can provide an e-mail address to receive notifications to alert them if someone is trying to use their card in an ATM. Also, the user can receive a 3-10 second video with the footage of the intruder, so they can show it to the police. In addition, the video footage can be shared with the bank for investigating the fraud.

During the onboarding of customers for this feature, the account owner registers his/her face on a trusted device (personal computer, phone or bank's ATM device) and that would be used as a reference for face matching. The user can update it when necessary.

Medical Clinics

In these settings, typically patient data subject to strict privacy and health care protection laws are readily accessible through terminals. Locking and unlocking terminals are hard since each time the staff touch the keyboard, they need to redo hand sanitation protocol. In addition, terminals are frequently shared between multiple staff which makes it hard to achieve audit logging (i.e., if something goes wrong, it won't be easy to figure out who was in front of the terminal at any given time).

Education

When a user uses their computer/laptop for an exam, it doesn't matter if they are doing it remotely or in person. GuacamoleID authenticates the user's identity and enables access through continuous facial recognition. Moment by moment GuacamoleID continuously scans to make sure the user's face—and only the user's face—has a view of the user's screen. This vigilant protection protects the user's privacy and information and blocks out threats.

If the user walks away from their device or their face goes undetected, the user's workstation is automatically blocked to prevent unauthorized viewing and will be instantly available once the authorized face is detected. If an unauthorized face is captured looking at the user's screen, a warning sign pops up to block their view and alert the user. Optionally, the teacher, or the person in charge of the examination, will receive notifications to alert them if a device has been compromised. A 3-10 second video with the footage of the intruder will be sent so the person responsible can address if something illegal has occurred.

Military Equipment (De-Credit Weapons/Machinery)

For military equipment, GuacamoleID authenticates a user's identity and enables access through continuous facial recognition. Moment by moment GuacamoleID continuously scans to make sure that the authorized persons have access to the equipment. This vigilant protection protects there military equipment and blocks out threats.

The system also works with person identification and person re-identification through other key points of the body. So if the face is completely covered, the system can identify if the right person is behind the machinery.

Unauthorized persons will not be able to use any military equipment without the appropriate clearance. This will avoid weapon aversion, and valuable military equipment from falling into the wrong hands. One can even design an auto-destroy system if an unauthorized person is trying to use the military equipment.

Smart Vehicles (Delivery Trucks, Trains, Cars, Police Cars, Subways, Airplanes, Etc.)

For vehicles, GuacamoleID authenticates a user's identity and enables access through continuous facial recognition. Moment by moment GuacamoleID continuously scans to make sure that the authorized persons have access to the vehicle. It is like a two-step verification code, but for vehicles. A user will need the key plus authentication of their identity. Unauthorized persons will not be able to use the vehicle. This will avoid your vehicle from falling into the wrong hands.

If a computer is not available in the setting, GuacamoleID may use an edge-AI server, such as NVIDIA Jetson processors to run AI algorithms and identify if the right person is behind the machine.

For airplanes, unauthorized persons may be prevented from piloting, or even being in the aircraft cabin. Once GuacamoleID detects an unauthorized person, the autopilot will automatically take charge of the craft and avoid anyone hijacking the aircraft. Also, an alert will be sent to the control cabin so additional measures can be taken.

Figure 8:
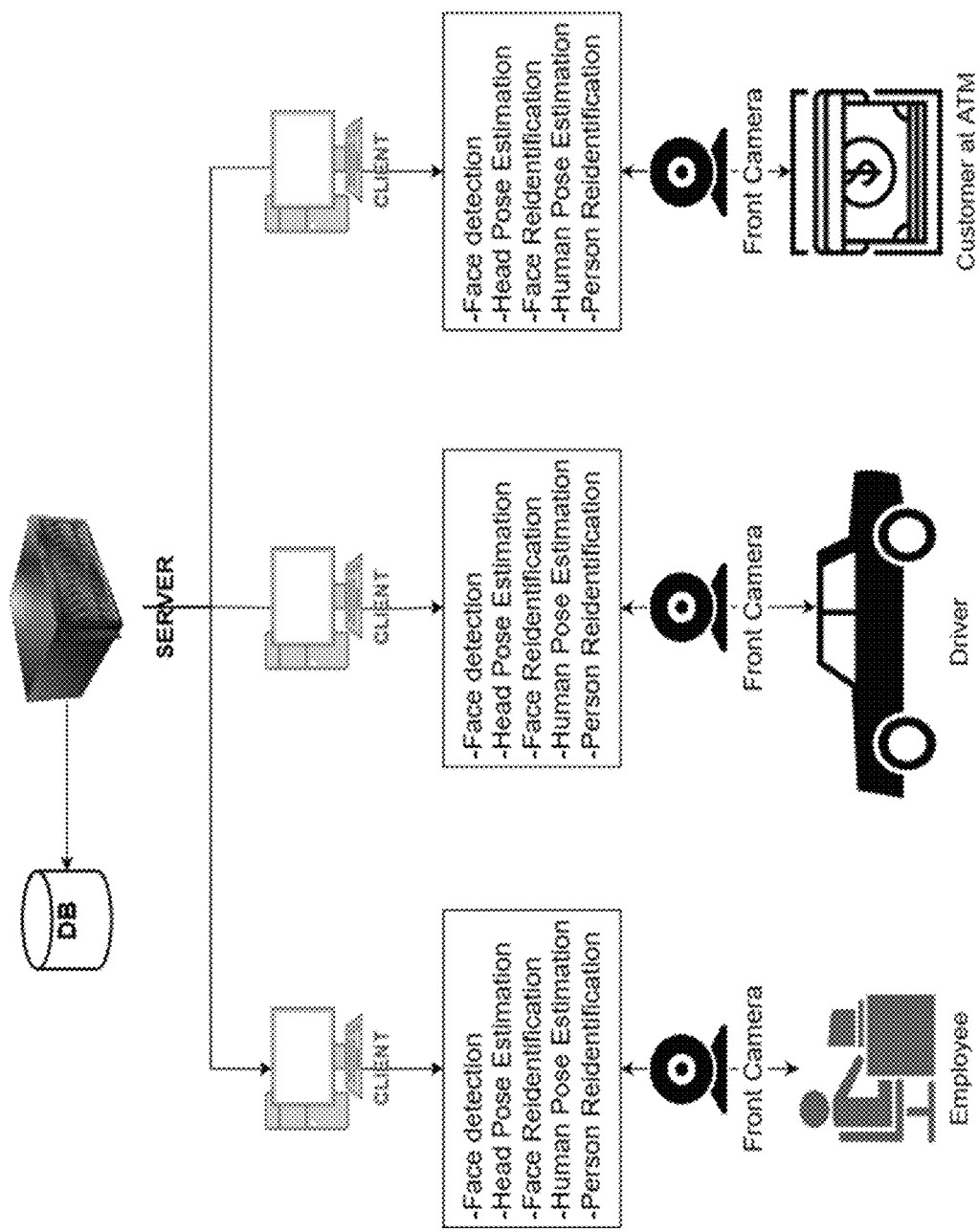
FIG. 8 presents a summary of technical details of three different use cases for of a system and method for biometric user authentication as disclosed herein.

FIG. 8 presents a summary of technical details of three different use cases for GuacamoleID: a workstation use case, a vehicle use case, and an automated teller machine (ATM) use case.

Additional use cases are presented in Table 1 below:

TABLE 1

Additional GuacamoleID Use Cases
FUNCTIONALITIES

| | | | |
|---|---|---|---|
| On-demand face verification | Continuous user authentication for workforce | Continuous face verification for customers (optional) | Access Management (remote - Guacamole platform) |
| verifying payments/ transactions | Computer-based biometric access to devices, applications, corporate accounts and sensitive data. | verifying b2b and inter-bank payments | Protect devices from former employees until returned to the company |
| verifying access to medical records | Ensuring only the right user has access to company resources | verifying b2b and inter-enterprise transactions | Real-time alert system for instant remediation |
| verifying bank account owner | Protecting company assets and information from off-premise use, such as coffee shops or co-working spaces by immediate response to prying eyes and shoulder surfing | verifying traders in trading desks | Provide insight on remote work efficiency |
| verifying traders | verifying access and view to legal documents | E-Commerce: preventing account take over | Know and control who and what device is accessing your resources. |

TABLE 1-continued

Additional GuacamoleID Use Cases
FUNCTIONALITIES

| | | | |
|---|---|---|---|
| Patient verification in Telehealth | verifying access and view to financial and accounting documents | E-Commerce: protecting payments and credit cards information | Workforce engagement analytics (for example time connected per workday) |
| Fast and reliable plant check-in and check-out | Proctoring and testing | Identity validation for remote exams (college, school) | Internal fraud threat detection |
| verifying user in social media account | verifying access in media and entertainment collaborators | KYC for any mobile platform supporting client decisions | Espionage threat detection |
| Verifying user in metaverse | verifying MSPs and cloud providers | Proof of life for senior citizens pension (using Liveness detection) | |
| verifying gig worker | Verifying operator in industrial and manufacturing, logistics and supply chain | KYC for virtual wallets and fintech apps (from onboarding to transactions) | |
| verifying users in web 3.0 applications | verifying soldiers in combat protecting against weapon aversion | Verifying user in metaverse | |
| verifying voters in voting machines | verifying access to heavy machinery, airplane, helicopters, etc. | eSports verification | |
| verifying Uber driver, truck drivers,delivery trucks | verifying Uber driver, truck drivers, delivery trucks | Verifying drone and remote machinery operators | |
| verifying access to heavy machinery, airplane, helicopter, etc. | Attention-detection and alert for drivers | verifying healthcare provider | |
| driver access verification to prevent underage drivers, carjacking | Attention-detection and alert for machinery, heavy equipment, factories, agriculture | | |
| Verifying identity at airport | Team viewer and tech support employee verification | | |
| Verifying outgoing travelers by land and sea | Verifying healthcare providers | | |
| Verifying signatures in legal documents | Verifying access to utilities grid, facilities, construction sites, power plants | | |
| Notary | Protecting against hijacking, carjacking | | |
| Verifying crypto account holder- NFT holder | Verifying access to FBI's CJIS | | |
| Remote Jury duty | access to medical records | | |
| Film industry editor verification | verifying soldiers in combat | | |
| Accountants balance certification - remote | | | |
| Verifying pensioners (Liveness detection) | | | |
| Verifying access to IRS, gov portals | | | |
| Access to government benefits remote interview for immigration/asylum seekers | | | |
| Payment for gamers eSports, gamers verification | | | |
| Identity validation for remote exams (college, school) | | | |

Method claims set forth below having steps that are designated by letters or numbered should not be considered to be necessarily limited to the particular order in which the steps are recited.

Embodiments of the disclosure are also described above with reference to flowchart illustrations and/or block diagrams of methods and systems. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flowchart and/or block diagram block or blocks. These computer program instructions may also be stored in a computer-readable memory that can direct a computer or other programmable data processing apparatus to operate in a particular manner, such that the instructions stored in the computer-readable memory produce an article of manufacture including instruction means which implement the acts specified in the flowchart and/or block diagram block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the acts specified in the flowchart and/or block diagram block or blocks.

In addition, methods and functions described herein are not limited to any particular sequence, and the acts or blocks relating thereto can be performed in other sequences that are appropriate. For example, described acts or blocks may be performed in an order other than that specifically disclosed, or multiple acts or blocks may be combined in a single act or block.

While the invention has been described in connection with what is presently considered to be the most practical and various embodiments, it is to be understood that the invention is not to be limited to the disclosed embodiments, but on the contrary, is intended to cover various modifications and equivalent arrangements.

The embodiments described above are intended only to illustrate and teach one or more ways of practicing or implementing the present invention, not to restrict its breadth or scope. The actual scope of the invention, which embraces all ways of practicing or implementing the teachings of the invention, is defined only by the following claims and their equivalents.

What is claimed is:

1. A method of maintaining the security of an authentication session, the method comprising:
   registering an authorized user with the computing device by building and storing a record of geospatial data about the face of the authorized user using video frames of the face from different angles;
   operating a camera device to continuously capture a view of an environment of a computing device;
   in a real time matching step:
      performing face detection using a facial detection model to detect all faces in the environment of the computing device;
      performing comparisons between faces detected in the environment of the computing device and faces of a set of authorized users by comparing the faces detected in the environment to biometric data provided by a set of authorized users;
      at a first time, detecting a first face of an authorized user of the set of authorized users in the view of the environment of the computing device and, in response, allowing the authorized user to operate the computing device;
   after the matching step, in a real time continuous object re-identification tracking step:
      representing the first face as a detection object in a frame of video captured by the camera device, the detection object comprising a face bounding box, face feature embeddings, head pose, and facial landmarks;
      in successive frames over a time period, continuously tracking the detection object in the view of the environment of the computing device multiple times per second using an object tracking algorithm and updating the status of the detection object by updating identifiers in a frame of each track through a matching cascade to correlate location history of the detection object in the view of the environment of the computing device across a time vector between the detection object and a prior recognition of the detection object using the prior recognition of the detection object, the status of the detection object based on a similarity comparison between video frames of the detection object and the prior recognition of the detection object to re-identify the detection object as the first face, the similarity comparison comprising performing pose estimation to obtain a difference vector and a cosine difference calculation between the detection object in the view of the environment and the prior recognition of the detection object, wherein difference vectors which are close in cosine distance indicate re-identification of the authorized user; and
      updating identifiers in a frame of each track through a matching cascade; and
   at a second time after the first time, one of failing to re-identify the detection object for more than a certain amount of time or detecting a second face that is not of an authorized user of the set in the view of the environment, and, in response, at least partially blocking operator access to input and output devices of the computing device,
   wherein re-identification of the detection object in the continuous tracking step requires a reduced amount of computational resources compared to the matching step.

2. The method of claim 1, wherein blocking the display of the computing device includes one of displaying a popup window that blocks the view of the screen or blurring the screen.

3. The method of claim 1, wherein blocking the display of the computing device includes displaying an advertisement on the display.

4. The method of claim 1, further comprising unblocking operation of the computing device responsive to the detecting the first face in the view of the environment subsequent to failing to detect the first face in the view of the environment.

5. The method of claim 4, wherein unblocking operation of the computing device is contingent on not detecting a second face in the view of the environment.

6. The method of claim 1, further comprising sending an alert to another computing device responsive to one of failing to detect the first face or detecting the second face in the view of the environment.

7. The method of claim 1, further comprising maintaining a record of faces in the view of the environment.

8. The method of claim 7, further comprising recording a video of the second face when the second face is in view of the environment.

9. The method of claim 1, wherein geospatial data about faces of the set of authorized users that uniquely identifies the faces are stored locally on the computing device.

10. The method of claim 1, wherein geospatial data about faces of the set of authorized users that uniquely identifies the faces is encrypted and shared between multiple computing devices connected within a local private network.

11. The method of claim 1, utilized independently of an initial form of user authentication that initially unlocks the computing device.

12. The method of claim 1, further comprising updating the stored record when a positive identification of the user is made to add alternative poses and improve future face matching effectiveness.

13. The method of claim 12, further comprising building the update to the stored record from video frames of the face from different angles captured by the camera device.

14. The method of claim 1, further comprising assessing environmental variables in the view of the environment and adjusting detection thresholds for performing a positive detection of faces in the view of the environment responsive to the environmental variables.

15. The method of claim 1, further comprising detecting and preventing spoofing by using vector of time to detect movement in head pose and features of the face over a time period to prevent 2D attacks.

16. The method of claim 1, wherein the view of the environment of the computing device comprises a plurality of detection objects, and the continuous tracking step tracks each of the plurality of detection objects.

17. The method of claim 1, wherein updating the status of the detection object to correlate location history of the detection object in the view of the environment of the computing device across a time vector comprises utilizes a counter to provide a historical vector of time factor to provide a confidence level of re-identification of the detection object as the first face.

18. The method of claim 17, wherein the counter is one or more of an intrusion counter, absence counter, and duplicity counter.

19. The method of claim 1, wherein the matching cascade incorporates a distance between features of the detection object over the time period to track movement of the detection object in the successive frames.

20. The method of claim 1, wherein the real time continuous object re- identification tracking step uses a deep association metric algorithm.

21. The method of claim 20, wherein the deep association metric algorithm is DeepSORT.

22. A non-transitory computer readable media having instructions encoded thereon, which when executed by a computer processor causes the computer processor to perform a method comprising:
operating a camera device to continuously capture a view of an environment of a computing device;
in a real time first matching step:
performing face detection using a facial detection model to detect all faces in the environment of the computing device;
performing comparisons between faces detected in the environment of the computing device and faces of a set of authorized users by comparing the faces detected in the environment to biometric data provided by a set of authorized users, the faces of the authorized users comprising a record of geospatial data about the face of the authorized user from video frames of the face from different angles;
at a first time, detecting a first face of an authorized user of the set of authorized users in the view of the environment of the computing device and, in response, allowing the authorized user to operate the computing device;
after the first matching step, in a real time continuous object re-identification tracking step:
representing the first face as a detection object in a frame of video captured by the camera device, the detection object comprising a face bounding box, face feature embeddings, head pose, and facial landmarks;
in successive frames over a time period, continuously tracking the detection object in the view of the environment of the computing device multiple times per second using an object tracking algorithm and updating the status of the detection object by updating identifiers in a frame of each track through a matching cascade to correlate location history of the detection object in the view of the environment of the computing device across a time vector between the detection object and a prior recognition of the detection object using the prior recognition of the detection object, the status of the detection object based on a similarity comparison between video frames of the detection object and the prior recognition of the detection object to re-identify the detection object as the first face, wherein performing a similarity comparison comprises performing pose estimation to obtain a difference vector and a cosine difference calculation between the detection object in the view of the environment and prior recognitions of the detection object, wherein difference vectors which are close in cosine distance indicate face re-identification of the authorized user; and
updating identifiers in a frame of each track through a matching cascade; and
in response to failing to re-identify the detection object for more than a certain amount of time, at least partially blocking operator access to input and output devices of the computing device,
wherein re-identification of the detection object in the continuous tracking step requires a reduced amount of computational resources compared to the first matching step.

* * * * *